United States Patent [19]

Lowery

[11] Patent Number: 4,604,002
[45] Date of Patent: Aug. 5, 1986

[54] PENDANT LINE CONNECTING LINK

[76] Inventor: Archie J. Lowery, Marrero, La.

[21] Appl. No.: 550,498

[22] Filed: Nov. 10, 1983

[51] Int. Cl.[4] .................. B63B 21/50; F16G 15/04
[52] U.S. Cl. ............................ 405/224; 59/85; 114/293
[58] Field of Search ............ 405/195, 224; 59/86, 59/85; 114/230, 264, 293

[56] References Cited

U.S. PATENT DOCUMENTS

| | | | |
|---|---|---|---|
| 466,080 | 12/1891 | Miller | 59/86 |
| 1,513,729 | 11/1924 | Adams | 59/85 |
| 2,369,344 | 2/1945 | Ehmann | 59/86 |
| 3,373,560 | 3/1968 | Manney et al. | 59/86 X |
| 3,461,828 | 8/1969 | Bielstein | 405/224 X |
| 3,903,705 | 9/1975 | Beck et al. | 405/224 |
| 4,048,945 | 9/1977 | Shrum | 405/224 X |
| 4,107,917 | 8/1978 | Fink | 59/85 |
| 4,134,255 | 1/1979 | McBain et al. | 59/86 X |
| 4,179,878 | 12/1979 | Albertini | 59/85 |

Primary Examiner—David H. Corbin
Attorney, Agent, or Firm—Harvey B. Jacobson

[57] ABSTRACT

A connecting link utilized in a pendant line for connecting lengths or segments of wire ropes used in anchoring offshore drilling barges and the like to facilitate the handling of the pendant line when it is being placed into service, removed from service and during storage by positively and securely but yet detachably connecting adjacent ends of adjacent segments in order to enable a pendant line of desired overall length to be utilized but yet easily handled when the pendant line is being assembled and placed into service or disassembled and stored on a reel when being removed from service.

2 Claims, 6 Drawing Figures

PENDANT LINE CONNECTING LINK

BACKGROUND OF THE INVENTION

1. Field of the Invention

The present invention generally relates to anchoring of movable objects such as offshore drilling barges, platforms, floating structures and the like in which elongated heavy cables or wire ropes are used and more particularly to connecting links which can be used to effectively and detachably interconnect lengths or segments of such wire ropes to form a pendant line so that the individual lengths of wire rope can be more efficiently handled when placing the pendant line in service, removing it from service and during storage.

2. Description of the Prior Art

Elongated pendant lines in the form of wire ropes are used to anchor various structures including offshore drilling rigs, platforms and the like. Such lines, usually referred to as pendant lines, have a relatively large diameter and are relatively difficult to handle when constructed as a continuous line. Also, the length requirements of such lines are varied so that it is desirable from a standpoint of handling the lines and from the standpoint of being able to vary the effective length of the lines to provide the lines in segmental lengths rather than a continuous wire rope or the like. Pendant lines are constructed to have a tensile strength exceeding 100 tons and thus, connecting structures between lengths of a pendant line must also be constructed to provide similar strength characteristics while at the same time provide a structure which enables quick and effective separation of and assembly of adjacent lengths of the pendant line so that the pendant line can be more easily assembled and disassembled for increasing the length thereof, decreasing the length thereof, placing the pendant line in service or removing it from service and storing it all of which is facilitated by the use of a connecting link.

The following prior U.S. patents are exemplary of the prior art in this field of endeavor and illustrate various connecting devices for cables:

| | |
|---|---|
| 466,080 | Dec. 29, 1891 |
| 2,369,394 | Feb. 13, 1945 |
| 4,107,917 | Aug. 22, 1978 |
| 4,134,255 | Jan. 16, 1979 |
| 4,145,874 | Mar. 27, 1979 |
| 4,179,878 | Dec. 25, 1979 |

SUMMARY OF THE INVENTION

An object of the present invention is to provide a connecting link specifically constructed for use in pendant lines in order to vary the lengths thereof thereby enabling the use of pendant lines composed of a number of lengths which in turn facilitates the handling of the pendant line when it is being placed into service, removed from service and during storage.

Another object of the invention is to provide a connecting link in accordance with the preceding object constructed to safely withstand a heavy load such as 110 tons with the areas of the link receiving the greatest stress being constructed in a manner to safely withstand such a load.

A further object of the invention is to provide a connecting link constructed of two generally U-shaped components having overlapping interdigitated apertured end portions receiving a transversely extending connecting pin that is retained in position by spring pins which are self-locking and received in a groove in the connecting pin and apertures in the ends of one leg of each U-shaped member so that the self-locking spring pin is reinforced throughout its load bearing area by the shoulders of the hole in the connecting link which intersects the groove formed in the connecting pin.

Still another object of the present invention is to provide a connecting link for pendant lines which can be easily and quickly assembled and disassembled and does not require the use of wrenches or tools for tightening bolts, nuts, set screws or the like therefore eliminates possible loosening of such components which results in a dependable, safe and long lasting connecting link capable of withstanding the forces normally encountered in a pendant line.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
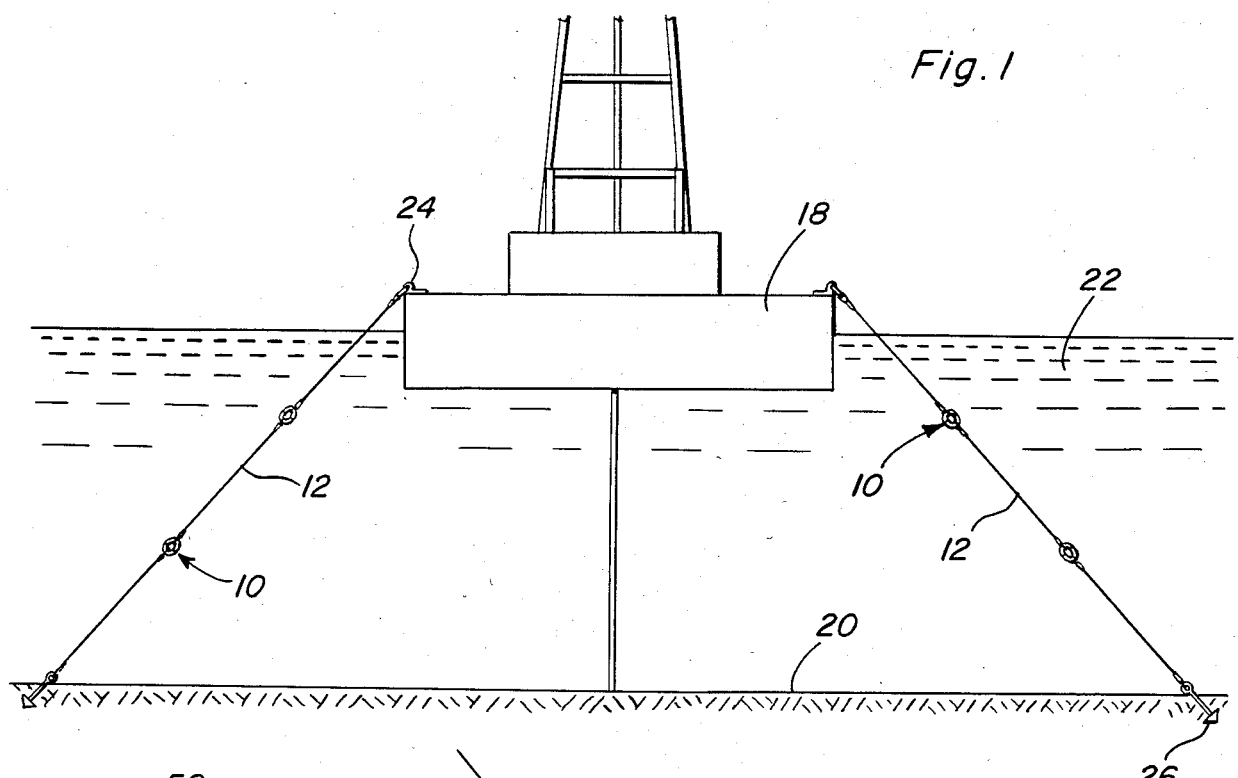
FIG. 1 is a schematic elevational view illustrating pendant lines associated with an offshore drilling barge or the like at one end with the other end being anchored to the seabed.

Referring now specifically to the drawings, the connecting link of the present invention is generally designated by reference numeral 10. As illustrated in FIG. 1, the connecting links 10 are utilized to interconnect adjacent lengths of a pendant line 12 so that any desired number of lengths can be assembled to form the pendant line 12. Each length of the pendant line 12 is in the form of a flexible member such as a wire rope or cable 14 having a loop or eye 16 formed on each end thereof in a conventional manner with the pendant line 12 being used to anchor a device such as an offshore drilling barge or platform 18 to the bottom 20 of a body of water 22 in a conventional and well known manner by extending between an attachment point 24 on the barge or platform 18 to an anchor device 26 in the seabed or the like.

Figure 5:
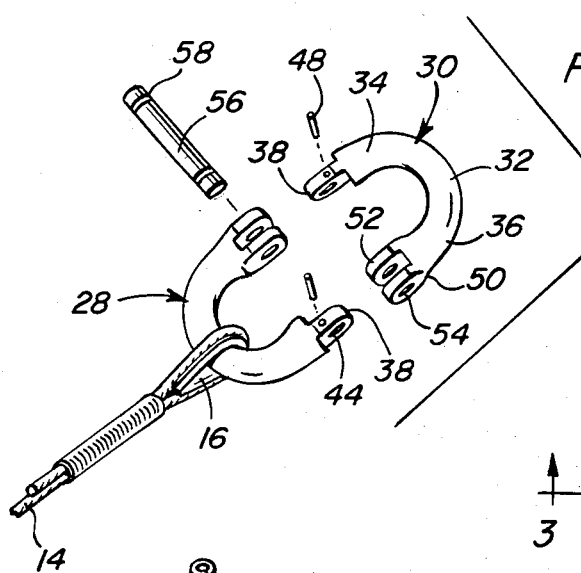
FIG. 5 is an exploded group perspective view of the components of the connecting link and its association with a pendant line.
Figure 2:
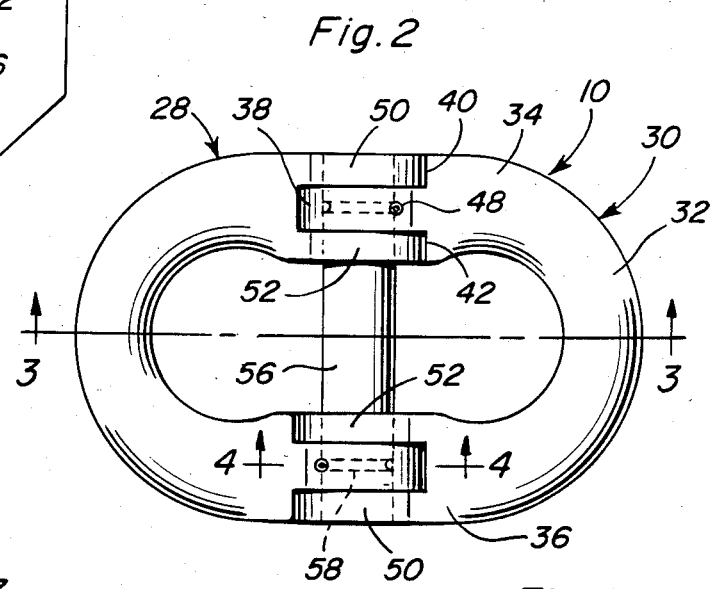
FIG. 2 is a plan view of the connecting link of the present invention.
Figure 6:
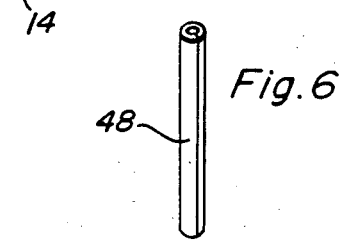
FIG. 6 is a perspective view of the self-locking spring pin used in the connecting link.
Figure 4:
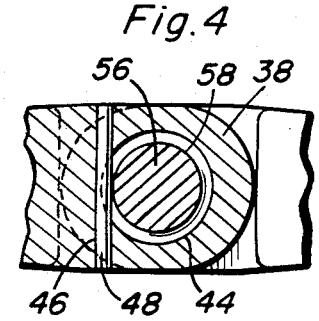
FIG. 4 is a fragmental sectional view, on an enlarged scale, taken substantially upon a plane passing along section line 4—4 on FIG. 2 illustrating further structural details of the spring pin and the groove in the connecting pin.

The connecting link 10 is constructed of two generally U-shaped members 28 and 30 which, when assembled, form an oval-shaped link with the end portions engaging the loops or eyes 16 on adjacent lengths of the pendant line 12. As illustrated in FIGS. 2 and 5, each of the generally U-shaped members 28 and 30 are of identical construction with each member including an arcuately curved central web 32 and generally parallel legs 34 and 36 with the leg 34 including an end lug 38 of reduced thickness to form a pair of shoulders 40 and 42 at its juncture with the leg 34 as illustrated in FIG. 2. The inner and outer surfaces of the lug 38 are flat and parallel and the end edge of the lug 38 is rounded or generally semi-cylindrical in configuration. The lug 38 includes a central aperture 44 extending therethrough in a direction generally transverse to and perpendicular to the leg 34. The lug 38 also includes a smaller aperture 46 in perpendicular relation to the larger transverse aperture 44 and in tangential communication with the aperture 44 at its inner edge as illustrated in FIG. 4 with the aperture 46 having a continuous inner peripheral surface at each end thereof and a portion of its center peripheral surface omitted where it intersects with the transverse aperture 44 in the lug 38. The aperture 46 receives a self-locking spring pin 48 in the form of a tubular pin having a longitudinal slit so that the pin 48 when inserted in the aperture 46 will frictionally engage the surfaces of the aperture 46 and self-lock itself in position. This type of pin may be a "Rollpin" and can be inserted by using a suitable impact instrument such as a hammer and the like and can be removed but only by using an impact tool and punch with the pin 48 being frictionally retained in position in the aperture 46 after it has been assembled therein.

Figure 3:
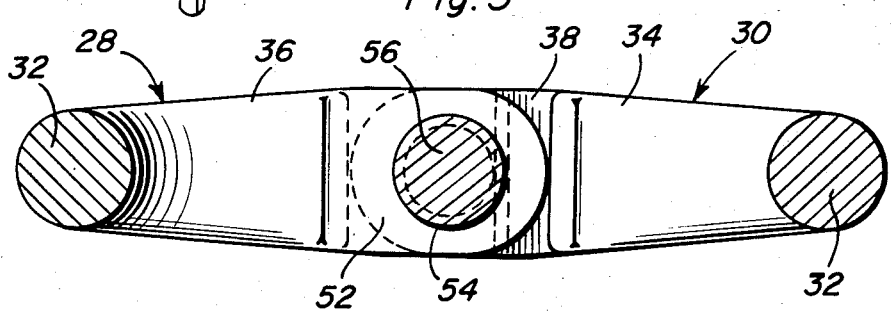
FIG. 3 is a longitudinal sectional view, on an enlarged scale, taken substantially upon a plane passing along section line 3—3 on FIG. 2 illustrating further structural details of the connecting link.

The other leg 36 is bifurcated and provided with a pair of lugs 50 and 52 which are spaced apart from each other a distance to closely receive the lug 38 on the opposite U-shaped member. The lugs 50 and 52 each have an aperture 54 extending therethrough with the apertures being aligned with the aperture 44 and being of the same size. The inner surfaces of the lugs 50 and 52 are parallel to each other and substantially flat and likewise the outer surfaces of the lugs 50 and 52 are parallel to each other and substantially flat as illustrated in FIG. 2 so that the interengaging surfaces between the lugs 50 and 52 and lug 38 are all substantially flat and parallel. The outer end edge of the lugs 50 and 52 are also generally semi-cylindrical in the same manner as the lug 38 as illustrated in FIG. 3 so that the U-shaped members 28 and 30 forming the connecting link can pivot in relation to each other when the two U-shaped members are interconnected by a connecting pin 56 of cylindrical, constant cross-sectional configuration with the connecting pin 56 being closely received in the aligned apertures 44 and 54 in the lugs 38, 50 and 52 respectively with the ends of the pin 56 being flush with the outer surfaces of the outer lugs 50 as illustrated in FIG. 2. The connecting pin 56 is provided with a peripheral groove 58 adjacent each end thereof with the peripheral grooves 58 being aligned with and in communication with the transverse apertures 46 in the lugs 38 when the link 10 is assembled as illustrated in FIG. 4. The depth of the groove 58 is such that it receives the periphery of the spring pin 48 with the periphery of the spring pin 48 engaging the bottom of the groove 58 as illustrated in FIG. 4 with the portion of the spring pin 48 opposite to that portion received in the groove 58 being in engagement with and reinforced by its engagement with the surface of the aperture 46 in alignmnent with the groove 58 so that the spring pin 48 is reinforced throughout its load bearing area by the continuous engagement of the periphery of the aperture 46 with the spring pin 48 in opposed relation to that portion of the spring pin 48 engaged with the groove 58 in the connecting pin 56.

While the dimensional characteristics of the connecting link may vary, it has been found that in order to provide the required strength characteristics, the connecting link has been successfully constructed and tested with a safe working load of 110 tons by providing a link with an overall length of one foot 10½ inches, an overall width of one foot 2⅜ inches and an overall depth of 4 5/16 inches. The web 32 of each U-shaped member is provided with a 3-inch diameter, the connecting pin 56 has a diameter of 2¾ inches with the spring pin 48 and the aperture 46 being 5/16 inch in diameter. The distance between the inner surface of lugs 52 is 6⅛ inches and the radius of curvature of the outer surface of the ends of the link as observed in FIG. 2 may be approximately 7 3/16 inches and the radius of curvature of the inner surface may be approximately 3⅜ inches. All of the surfaces of the lugs and adjacent shoulders are rounded or radiused and the components are constructed of high strength metal capable of providing the desired strength requirements.

The pendant line connecting link of this invention is specially constructed for use in connecting the eyes 16 in the end of wire rope or cable of limited lengths in order to form a pendant line of sufficient length to secure offshore drill platforms and/or barges in relatively immobile position for the purpose of oil well drilling activities. Pendant wire rope lines are of varying lengths and weights by reason of the fact that each has to be wound onto a reel for transportation to the offshore drill site where the parts are then connected together to form a length of cable or pendant line to secure the offshore oil well barge or platform in position. When the oil well drilling activities have been completed, the pendant lines are then divided into their respective parts and rewound onto reels for future use. During the time the drill barge is in working position, it must be maintained in a immobile relation by a number of anchors which are secured in the seabed at varying distances from the drill barge and/or drill platform depending upon the depth of the water and other natural conditions such as tides, seabed composition and the size of the structure being immobilized. The connecting link of the present invention includes the self-locking "Rollpin" which is seated partially in a groove in the body of the connecting pin and partially in a groove forming part of the aperture through the lug on the connecting link so that when these components are assembled, they form an accurate hole into which the lock pin can be inserted. The lock pin can be simply driven into position and will retain itself in position until it is removed by punching it out of the hole. The hole receiving the lock pin is slightly smaller in diameter than the lock pin so that the lock pin is slightly compressed when inserted with the resiliency of the lock pin causing it to spring back toward its original position thereby locking itself into position until forcibly removed. This arrangement provides a safety factor since the lock pin cannot be accidentally disengaged or work loose such as might occur with bolt or screw-type fasteners. In the connecting link of this invention, the load supporting pin or connecting pin extends through the interdigitated bifurcated ends and lug end in such a manner that it improves the strength of the entire connecting link. When a connecting link is stressed, there is a tendency for it to elongate which in turn causes a distortion of the arch into which the wire loops are placed which permits the connecting pin to fail. The orientation of the bifurcated end and tongue or lug construction strengthens the area of the connecting link where the two components are connected by the load bearing pin thus providing a connecting link with unusual strength which resists elongation and thus results in greater safety.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pendant line connecting link comprising a pair of substantially identical U-shaped members each having a pair of generally parallel legs and a curved web, the free end of one leg having a pair of spaced apertured lugs, the free end of the other leg including a single apertured lug received between the spaced lugs when the U-shaped members are assembled to form a generally oval-shaped link, a connecting pin extending through the apertured lugs on the free ends of the legs and a lock pin interconnecting the connecting pin and at least one of the U-shaped members, said lugs having parallel surfaces with the single lug substantially filling the space between the pair of spaced lugs, said connecting pin including a peripheral groove adjacent each end thereof, said lock pin being received in a hole extending through the single lug in perpendicular relation to the aperture through the lug, the central portion of the hole intersecting the central portion of the aperture and in registry with the groove in the connecting pin, said lock pin having a central portion received in said groove in the connecting pin thereby retaining the connecting pin assembled with the lugs, said hole in the single lug being adjacent the juncture of the single lug and leg with the central portion of the hole including a continuous surface engaging the central portion of the lock pin opposite to the surface of the lock pin received in the groove for providing continuous support for the lock pin in opposed relation to the connecting pin, said lock pin being a longitudinally split tubular pin of resilient material having a diameter slightly larger than the hole for frictional, self-locking retention of the lock pin in the hole, said single lug having a thickness substantially less than the thickness of the free end of the leg to form shoulders at the inner end of the single lug, said pair of lugs having remote outer surfaces generally flush with the outer surfaces of the leg, said pair of lugs having a constant thickness substantially the same as the width of the shoulders, the innermost surfaces on the pairs of lugs being spaced apart with the portion of the connecting pin extending between the innermost surfaces on the pairs of lugs being completely exposed, the radius of curvature of the inner surface of the web being slightly larger than one-half the distance between the innermost surfaces on the pair of lugs, the free ends of the pair of lugs being disposed closely adjacent to the shoulders and the free end of the single lug being disposed closely adjacent the portion of the leg between the pair of lugs.

2. In combination, a plurality of lengths of wire rope each having an eye on each end thereof to enable a selected number of lengths to be connected to form a pendant line extending from a drilling barge to an anchor device in the seabed and disconnected for winding on a reel for transport and storage, a connecting link interconnecting the eye on adjacent lengths of wire rope, said connecting link comprising a pair of substantially identical U-shaped members, each having a pair of generally parallel legs and a curved web, the free end of one leg having a pair of spaced apertured lugs, the free end of the other leg including a single apertured lug received between the spaced lugs when the U-shaped members are assembled to form a generally oval-shaped link, a connecting pin extending through the apertured lugs on the free ends of the legs and a lock pin interconnecting the connecting pin and at least one of the U-shaped members, said lugs having parallel surfaces with the single lug substantially filling the space between the pair of spaced lugs, said connecting pin including a peripheral groove adjacent each end thereof, said lock pin being received in a hole extending through the single lug in perpendicular relation to the aperture through the lug, the central portion of the hole intersecting the central portion of the aperture and in registry with the groove in the connecting pin, said lock pin having a central portion received in said groove in the connecting pin thereby retaining the connecting pin assembled with the lugs, said hole in the single lug being adjacent the juncture of the single lug and leg with the central portion of the hole including a continuous surface engaging the central portion of the lock pin opposite to the surface of the lock pin received in the groove for providing continuous support for the lock pin in opposed relation to the connecting pin, said lock pin being a longitudinally split tubular pin of resilient material having a diameter slightly larger than the hole for frictional, self-locking retention of the lock pin in the hole, said single lug having a thickness substantially less than the thickness of the free end of the leg to form shoulders at the inner end of the single lug, said pair of lugs having remote outer surfaces generally flush with the outer surfaces of the leg, said pair of lugs having a constant thickness substantially the same as the width of the shoulders, the innermost surfaces on the pairs of lugs being spaced apart with the portion of the connecting pin extending between the innermost surfaces on the pairs of lugs being completely exposed, the radius of curvature of the inner surface of the web being slightly larger than one-half the distance between the innermost surfaces on the pair of lugs, the free ends of the pair of lugs being disposed closely adjacent to the shoulders and the free end of the single lug being disposed closely adjacent the portion of the leg between the pair of lugs.

* * * * *